United States Patent
Chen et al.

(10) Patent No.: US 12,455,751 B2
(45) Date of Patent: Oct. 28, 2025

(54) ENHANCING ACCESSIBILITY FOR INDIVIDUALS WITH DISABILITIES

(71) Applicant: INTERNATIONAL BUSINESS MACHINES CORPORATION, Armonk, NY (US)

(72) Inventors: Dong Chen, Beijing (CN); Ye Chuan Wang, Beijing (CN); Xiang Wei Li, Beijing (CN); Ju Ling Liu, Beijing (CN); Yu An, Beijing (CN); Wei Yan, Beijing (CN); Ting Ting Zhan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 18/211,373

(22) Filed: Jun. 19, 2023

(65) Prior Publication Data
US 2024/0419464 A1   Dec. 19, 2024

(51) Int. Cl.
  *G06F 3/04845*   (2022.01)
  *G06F 9/451*   (2018.01)

(52) U.S. Cl.
  CPC .......... *G06F 9/453* (2018.02); *G06F 3/04845* (2013.01)

(58) Field of Classification Search
  CPC ... G06F 9/453; G06F 9/04845; G06F 3/04845
  See application file for complete search history.

(56) References Cited

U.S. PATENT DOCUMENTS

| | | | |
|---|---|---|---|
| 11,574,579 B2 * | 2/2023 | Singh | G09G 5/026 |
| 12,236,435 B2 * | 2/2025 | Brazao | H04L 63/08 |
| 2020/0371754 A1 * | 11/2020 | P K | G06F 8/20 |
| 2022/0129123 A1 * | 4/2022 | Nair | G06F 8/38 |
| 2022/0366131 A1 * | 11/2022 | Ekron | G06F 16/9538 |
| 2023/0389822 A1 * | 12/2023 | Palamadai | A61B 5/1118 |

(Continued)

FOREIGN PATENT DOCUMENTS

| | | |
|---|---|---|
| CN | 204168399 U | 2/2015 |
| CN | 104391638 A | 3/2015 |
| KR | 102016676 B1 | 8/2019 |

(Continued)

OTHER PUBLICATIONS

Tariq et al., "Virtual Reality for Disabled People: A Survey," IEEE, 2018 International Conference on Open Source Systems and Technologies (ICOSST), Dec. 21, 2018, 5 pages.

(Continued)

*Primary Examiner* — Tadesse Hailu
(74) *Attorney, Agent, or Firm* — Jeffrey M. Ingalls

(57) ABSTRACT

Disability-related information of a user of a computing device can be acquired, the computing device can present a scene with user interface elements to the user. An accessibility requirement of the user can be identified based on the acquired disability-related information of the user. A processing routine can be determined from a plurality of processing routines stored in a routine library based on the accessibility requirement of the user. One or more of the user interface elements of the scene can be modified using the determined processing routine. The scene with the modified one or more of the user interface elements can be presented to the user through the computing device.

15 Claims, 10 Drawing Sheets

(56) References Cited

U.S. PATENT DOCUMENTS

2024/0127334 A1\* 4/2024 Rassouli .............. G09B 21/006

FOREIGN PATENT DOCUMENTS

| KR | 102199165 B1 | 1/2021 |
| KR | 20210051278 A | 5/2021 |

OTHER PUBLICATIONS

Sharma et al., "AI and VR Enabled Modern LMS for Students with Special Needs," Journal of Foreign Language Education and Technology, 8(1), Feb. 6, 2023, 14 pages.

Sghaier et al., "Development of an intelligent system based on metaverse learning for students with disabilities," Frontiers in Robotics and AI, Dec. 6, 2022, 15 pages.

\* cited by examiner

ENHANCING ACCESSIBILITY FOR INDIVIDUALS WITH DISABILITIES

BACKGROUND

The present disclosure relates to accessibility, and more specifically, to enhancing accessibility for individuals with disabilities.

Websites, applications and other digital creations available from various digital platforms are intended to work for all people, regardless of how a user accesses the services. However, when the websites, applications and digital creations are designed improperly, accessibility issues can create obstacles that make it difficult or impossible for individuals with disabilities to use the related products and services.

In recent years, a multitude of services have moved online, and people rely on these services like never before for various activities of daily living. It is challenging for developers and organizations to create high quality services accessible to users with a diverse range of hearing, movement, sight, and cognitive disabilities.

SUMMARY

According to one embodiment of the present disclosure, there is provided a computer-implemented method for enhancing accessibility for individuals with disabilities. Disability-related information of a user of a computing device can be acquired, the computing device can present a scene with user interface elements to the user. An accessibility requirement of the user can be identified based on the acquired disability-related information of the user. A processing routine can be determined from a plurality of processing routines stored in a routine library based on the accessibility requirement of the user. One or more of the user interface elements of the scene can be modified using the determined processing routine. The scene with the modified one or more of the user interface elements can be presented to the user through the computing device.

According to another embodiment of the present disclosure, there is provided a system for enhancing accessibility for individuals with disabilities. The system comprises one or more processors, a memory coupled to at least one of the processors and a set of computer program instructions stored in the memory. When executed by at least one of the processors, the set of computer program instructions perform following actions. Disability-related information of a user of a computing device can be acquired, the computing device can present a scene with user interface elements to the user. An accessibility requirement of the user can be identified based on the acquired disability-related information of the user. A processing routine can be determined from a plurality of processing routines stored in a routine library based on the accessibility requirement of the user. One or more of the user interface elements of the scene can be modified using the determined processing routine. The scene with the modified one or more of the user interface elements can be presented to the user through the computing device.

According to a yet another embodiment of the present disclosure, there is provided a computer program product for enhancing accessibility for individuals with disabilities. The computer program product comprises a non-transitory computer readable storage medium having program instructions embodied therewith. The program instructions are executable by a processor to cause the processor to perform following actions. Disability-related information of a user of a computing device can be acquired, the computing device can present a scene with user interface elements to the user. An accessibility requirement of the user can be identified based on the acquired disability-related information of the user. A processing routine can be determined from a plurality of processing routines stored in a routine library based on the accessibility requirement of the user. One or more of the user interface elements of the scene can be modified using the determined processing routine. The scene with the modified one or more of the user interface elements can be presented to the user through the computing device.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
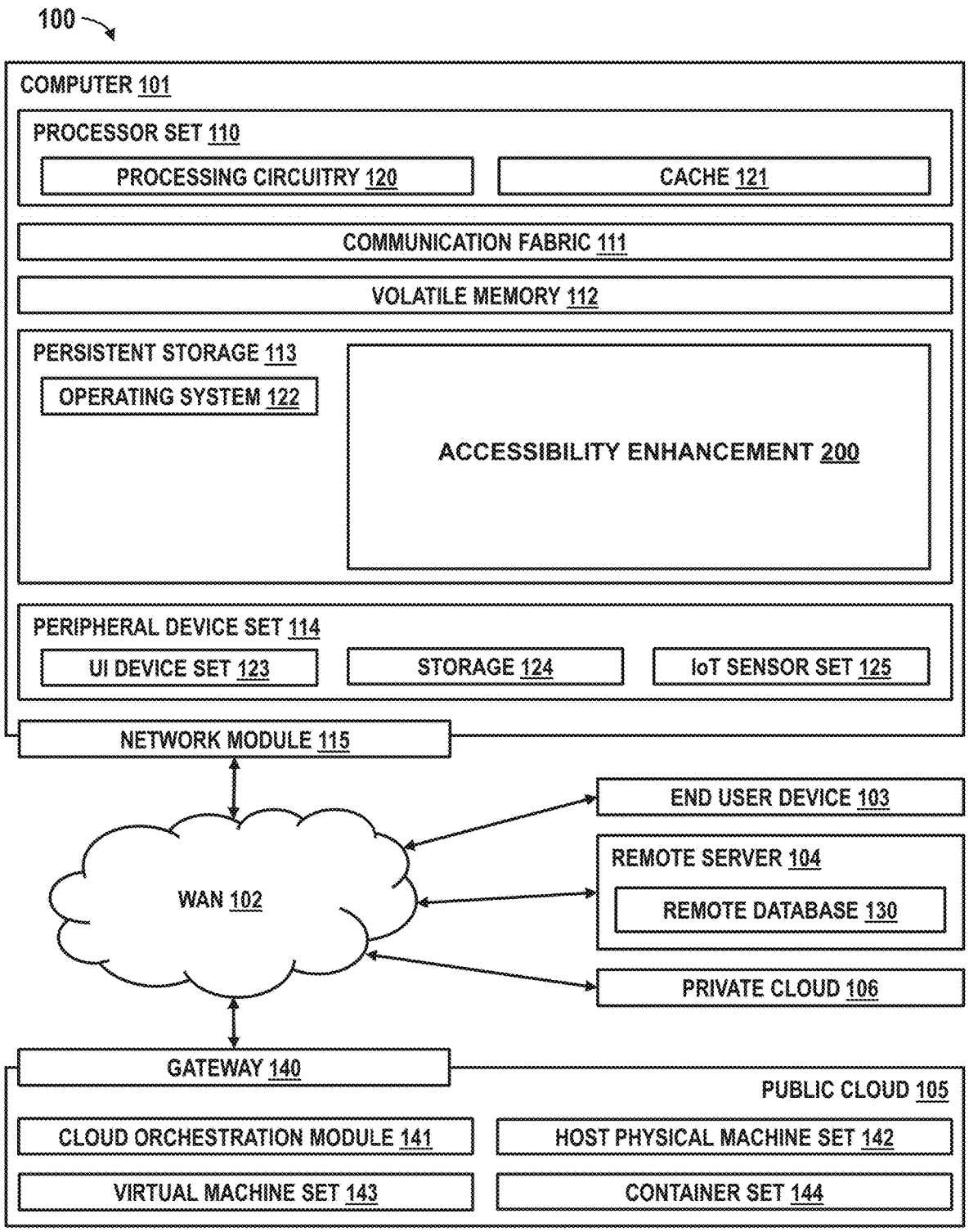
FIG. 1 shows an exemplary computing environment which is applicable to implement the embodiments of the present disclosure.

Referring to FIG. 1, computing environment 100 contains an example of an environment for the execution of at least some of the computer code involved in performing the methods of the present embodiments, such as accessibility enhancement 200. In addition to the accessibility enhancement 200 block, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and accessibility enhancement 200 block, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the methods of the present embodiments"). These computer readable program instructions are stored in various types of computer readable storage media, such as cache 121 and the other storage media discussed below. The program instructions, and associated data, are accessed by processor set 110 to control and direct performance of the methods of the present embodiments. In computing environment 100, at least some of the instructions for performing the methods of the present embodiments may be stored in accessibility enhancement 200 block in persistent storage 113.

COMMUNICATION FABRIC 111 are the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in accessibility enhancement 200 block typically includes at least some of the computer code involved in performing the methods of the present embodiments.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage 124 may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the methods of the present embodiments can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is understood that the computing environment 100 in FIG. 1 is only provided for illustration purpose without suggesting any limitation to any embodiment of this disclosure, for example, at least part of the program code involved in performing the methods of the present embodiments could be loaded in cache 121, volatile memory 112 or stored in other storage (e.g., storage 124) of the computer 101, or at least part of the program code involved in performing the methods of the present embodiments could be stored in other local or/and remote computing environment and be loaded when need. For another example, the peripheral device 114 could also be implemented by an independent peripheral device connected to the computer 101 through interface. For a further example, the WAN may be replaced and/or supplemented by any other connection made to an external computer (for example, through the Internet using an Internet Service Provider).

As mentioned above, accessibility issues can create obstacles that make it difficult or impossible for individuals with disabilities to use websites, applications and other digital creations which are improperly designed. It has been extremely challenging for developers to create an excellent user interface (UI), such that with the aid of the user interface elements of the scene presented in the UI, the related products and services are easily accessible to users with a diverse range of hearing, movement, sight, and cognitive disabilities. Accordingly, accessibility features, which refers to features that make the services accessible to a user who otherwise would find it difficult to use the services due to a disability, is essential for the design and creation of the related products and services. There is a variety of accessibility requirements that need to be met for different users with a diverse range of disabilities.

As an illustrative example, a metaverse platform may integrate multiple emerging technologies including but not limited to virtual reality (VR), augmented reality (AR), three-dimensional (3D) modeling and reconstruction, internet of things (IoT), 5G, artificial intelligence (AI), blockchain, cloud computing, and spatial computing, and it may provide an immersed user experience for work, shopping, education, social media, entertainment, and the like. Metaverse, which is a virtual world constructed by humans using digital technologies, can be mapped to and interact with the real world (that is, virtual reality and beyond reality), so as to allow users to interact virtually in a collective virtual shared space with the aid of the UI design, for example, for an AR scene presented to the users.

With the improvement and growth of the underlying digital technologies, the field of metaverse is evolving rapidly to enhance the user experience obtained from the metaverse services. People who have disabilities and corresponding accessibility requirements in real life also hope to help themselves improve their life and work experiences, for example, by interacting with the metaverse through the user interface elements within the scene experienced by the users. There is, however, no efficient approach to provide the user interfaces of the websites, applications and other digital platforms (such as a metaverse platform) with a proper accessibility feature that matches a particular user's accessibility requirement from among a plurality of users with a diverse range of disabilities.

In view of the above, there exists a need for an augmented UI adaption approach for enhancing accessibility for individuals with disabilities, which provides a proper accessibility feature according to each user's accessibility requirement.

Embodiments of the present disclosure aim to solve at least one of the technical problems described above, and propose a method, system and computer program product for enhancing accessibility for individuals with disabilities based on the user's disability-related information and associated accessibility requirement. In the UI adaption approach according to embodiments of the present disclosure, a user may use their computing device (such as a smart phone, laptop, desktop, and a pair of smart glasses) to obtain access to services provided from websites, applications and other digital platforms. For example, the users may obtain the services by seeing, hearing, feeling and interacting with the user interface elements of the scene (e.g., an AR scene) presented to the user. However, some of the user interface elements may have accessibility defects that prevent the user with disabilities from obtaining access to the services efficiently and conveniently.

In view of this, the disability-related information of the user (such as an ID of a registered user which may indicate the presence and severity level of disabilities, or the type of disability and its severity level explicitly input by the user, and the like) can be acquired, such that the user's accessibility requirement can be identified based on the acquired disability-related information, for example, by retrieving a matched accessibility requirement from a personal or public accessibility requirement repository. Accordingly, a proper processing routine that matches the user's disability-related information and associated accessibility requirement can be selected from a plurality of predefined processing routines and can be used to modify and adapt the user interface elements of the scene presented to the user through the computer device, such that the accessibility of the services can be enhanced.

It should be noted that aspects of the present disclosure are described hereinafter mainly in the context of obtaining access to services in a metaverse system. However, it should be noted that the embodiments of the present disclosure for enhancing accessibility for individuals with disabilities also apply to the other systems where the users obtain their access to the services by accessing websites, applications, etc. The present disclosure does not restrict the way to obtain the related services.

Figure 2:
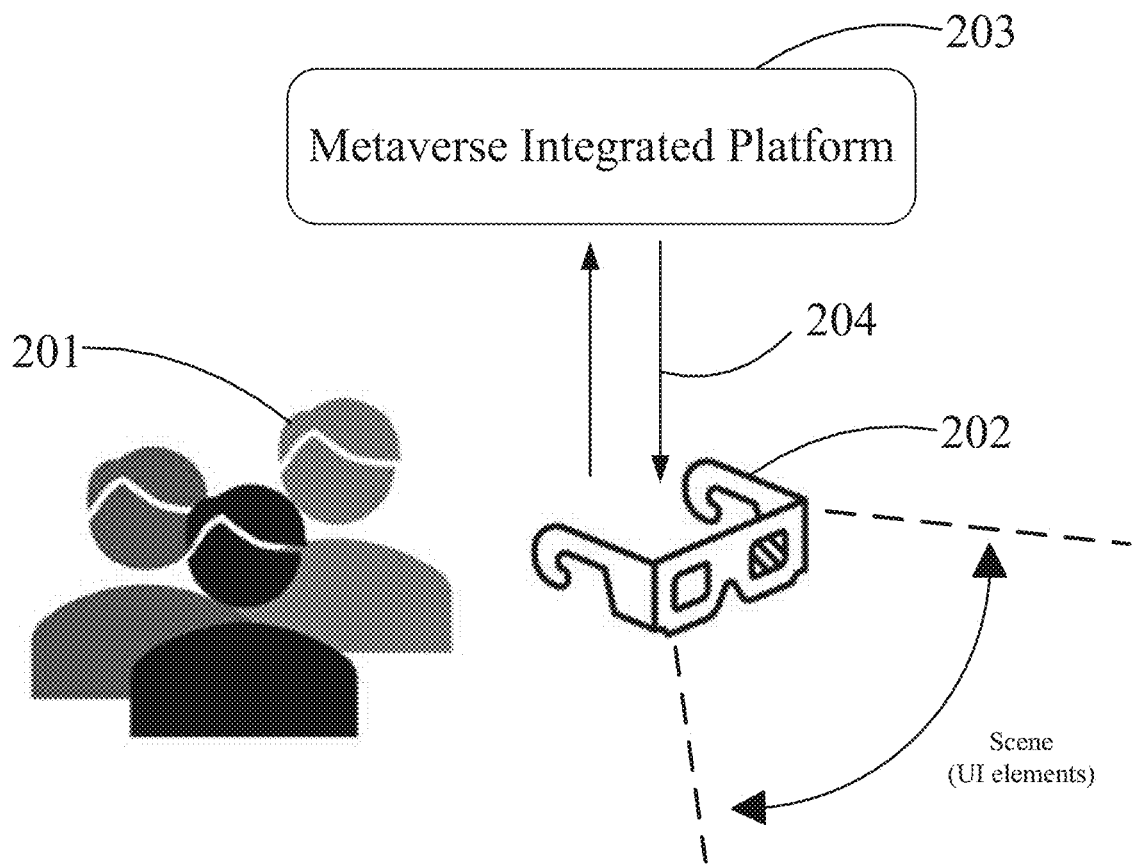
FIG. 2 shows a conventional architecture for providing augmented reality (AR) services to users with disabilities in a metaverse system.

FIG. 2 shows an architecture for providing services to users with disabilities in a metaverse system. As shown in FIG. 2, the architecture for the metaverse system may involve a plurality of users 201, a computing device 202 used by a corresponding user among the plurality of users 201, a metaverse integrated platform 203, and a communication link 204 established between the computing device 202 and metaverse integrated platform 203. In the metaverse system as shown in FIG. 2, the plurality of users 201 can be presented with an augmented scene of the real world that includes a real-world representation of a physical environment that is overlaid with virtually generated digital content, including but not limited to visual content, audible content, tactile content, or a suitable combination thereof.

Metaverse integrated platform 203 can be an integrated platform that includes a collection of one or more computing devices and integrates multiple emerging technologies including but not limited to VR, AR, 3D modeling and reconstruction, IoT, 5G, AI, blockchain, cloud computing, and spatial computing and the like. Metaverse integrated platform 203 can be used or controlled by one or more service providers to enable the users to immerse themselves in a virtual shared space where the digital and physical worlds converge, for example, with the aid of the user interface elements presented to the user through the computing device 202.

Computing device 202 can be any computing device that is used and controlled by a user 201 (for example, a customer of the metaverse service provider) to navigate the metaverse through their eye movement, gesture feedback or voice commands with respect to the scene presented to the user. Computing device 202 can be in a form of smart eye-glasses, as shown in FIG. 2. Alternatively, other types of computing devices, such as head mounted display (HMD), augmented reality headsets, and mobile devices (e.g., smart phone or tablet) running an augmented reality application, can be used by the users to navigate the metaverse.

Communication link 204 can be any wireless communication link capable of communicating data between the metaverse integrated platform 203 and the computing device 202. The communicated data can include pose and orientation data of the user relative to the metaverse environment over time, and can also include video, audio and other data related to the scene with user interface elements to be presented to the user, among other examples.

As shown in the architecture of FIG. 2, the metaverse integrated platform 203 can receive the pose and orientation data of the user from the computing device 202 over time, and transmit the data of the AR scene corresponding to the user's current pose and orientation to the computing device 202. Thereafter, the computing device 202 can project the digital content corresponding to the AR scene with user interface elements within the current field of view of the user, such that the user may learn about and interact with the metaverse environment with the aid of the user interface elements. In an illustrative example of FIG. 2, the scene presented to the user 201 corresponds to a portion of a full 360-degree range of the fusion of virtual and reality worlds, which can be a real-time AR view of the environment corresponding to the user's current pose and orientation.

It should be noted that the user interface elements within the scene presented to the user can include interactive elements (such as virtually generated buttons or menus that can be pressed or selected by the user using gesture feedback or voice commands, virtually generated keyboard or keypad that can be used by the user for typing text, among other examples) and non-interactive elements (such as alerting icons or sounds that are used to provide hint information or notifications to the user but cannot be manipulated by the user). The user interface elements can be used by the user to understand and navigate the metaverse. In addition, the user interface elements presented within the scene can be of various types, such as text-based type, graphical type, voice type, or a combination thereof.

However, accessibility issues may occur with the architecture of FIG. 2 when different users with a diverse range of disabilities are navigating in the metaverse environment. As an illustrative example, a user with color blindness may use their computing device to navigate the metaverse, but may be unable to distinguish certain colors in the environment. In this case, if the user interface elements with different meanings are distinguished from each other only by colors, the user may encounter confusion or obstacles in efficiently understanding and interacting with these user interface elements having accessibility defects.

Figure 3:
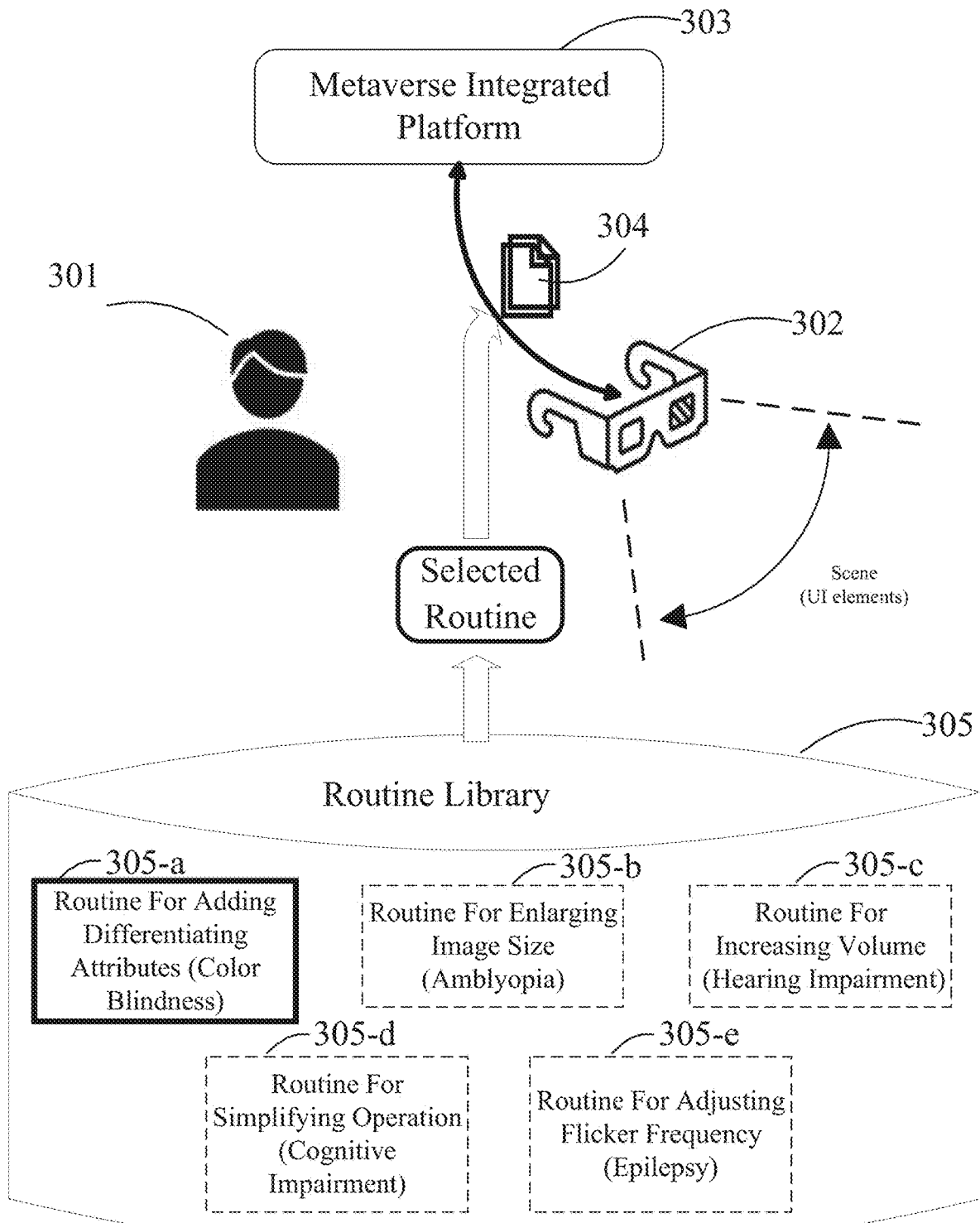
FIG. 3 shows an exemplary architecture for enhancing accessibility for individuals with disabilities according to an embodiment of the present disclosure.

FIG. 3 shows an exemplary architecture for enhancing accessibility for individuals with disabilities according to an embodiment of the present disclosure. As shown in FIG. 3, the architecture for the metaverse system may involve a particular user 301 from among a plurality of users (such as the plurality of users 201 as shown in FIG. 2), a computing device 302 used by the user 301, a metaverse integrated platform 303, a piece of streamed data 304 of the AR scene to be presented to the user 301 through the computing device 302, and a routine library 305. It should be noted that the processing of enhancing accessibility for individuals with disabilities according to embodiments of this disclosure could be implemented in the computing environment of FIG. 1, in order to facilitate accessibility of the metaverse services to a user with disabilities. Accordingly, the accessibility feature can be smoothly connected to the metaverse, so that people with disabilities can improve their life and work experience in the real world through the metaverse.

When the user 301 uses the computing device 302 to obtain access to the metaverse system with the aid of the user interface elements of the presented AR scene, the disability-related information of the user can be acquired from various information sources. In an embodiment of the present disclosure, the disability-related information of the user can indicate one or more of the following types of disabilities such as, visual impairment, hearing impairment, cognitive impairment, neurological disorder, and motor dysfunction, or a combination thereof.

For example, the indicated visual impairment information may indicate that the current user 301 is totally blind, color-blind, color-impaired, amblyopic, or has other levels of visual impairments. As another example, the indicated hearing impairment information may indicate that the current user 301 has a certain level of hearing loss ranging from deaf to hard of hearing. As yet another example, the indicated cognitive impairment information may indicate that the current user 301 has a certain level of cognitive disabilities including intellectual disabilities, learning disabilities, such as dyslexia and attention deficit hyperactivity disorder, and the like. As additional examples, the indicated neurological disorder information may indicate the current user 301 has a certain neurological disorder such as photosensitive epilepsy triggered by flashing or flickering lights, and the indicated motor dysfunction information may indicate the current user 301 has disabilities concerning movement, which may involve purely physical issues (such as loss of limb or paralysis), or weakness or loss of control in limbs (such as inflexible fingers). According to the embodiments of the present disclosure, the disability-related information of the user can be acquired in various ways.

In an embodiment, when the user is a registered user of the metaverse system, the ID of the user can be used as the disability-related information. According to the user ID, the type of the disability of the user and the severity level of the disability can be determined, and possibly together with other user information such as names, ages, heights, and weights of the user of the metaverse system.

In another embodiment, the user can provide their personal information, such as user ID in other entertainment or social platforms as well as clinics, such that the disability-related information of the user can be acquired from a heath record of the user, or the user's profiles from other entertainment or social platforms, if the information sharing is authorized by the user.

In typical embodiments, the systems herein may be in an opt-in configuration with respect to the user's personal information. In other words, the systems may not access or control a user's personal information without that user requesting the system to do so by opting in. Such a system would not, for example, access, obtain, analyze, identify, store, process, distribute, share, or publicize a user's personal identifiable information or information related to a user's disability without the user expressly requesting the system to do so by opting in to those features.

In yet another embodiment, the user may explicitly input their disability-related information before or at the start of accessing the metaverse system. For example, a new user of the metaverse system may provide their disability-related information when accessing the metaverse system for the first time. As another example, a registered user may provide their supplemental disability-related information in their second and subsequent access in the metaverse system. Such disability-related information may indicate the presence of one or more disabilities such as visual impairment, hearing impairment, cognitive impairment, neurological disorder, motor dysfunction, or a combination thereof. Additionally, the disability-related information may further indicate a severity level of the disabilities, such as which colors are recognizable and which are not for a user with color blindness, the level of hearing loss of a hearing-impaired user, and the like.

As mentioned above, the users of the metaverse system may have a diverse range of hearing, movement, sight, and cognitive disabilities. As a result, they may encounter different problems in navigating the metaverse and may have various types of accessibility requirements to enhance their user experiences.

Accordingly, in order to provide a metaverse service which is well adapted for the user's disability, the accessibility requirement of the user 301 can be identified based on the acquired disability-related information. In the embodiments of the present disclosure, the accessibility requirement of the user can indicate a requirement for enhancing one or more of the user interface elements in a type corresponding to the user's disability. For example, for a user that has not completely lost the hearing ability, the requirement may be for enhancing the user interface elements in its current auditory type, such as increasing the volume of these user interface elements to match the user's hearing level.

Additionally, or alternatively, the accessibility requirement of the user can indicate a requirement for converting one or more of the user interface elements in the type corresponding to the user's disability into a different type, such that the user may use another sensory organ to assist in dealing with their impairment. For example, for a user that has completely lost the hearing ability, the requirement may be for converting the user interface elements of an auditory type into a visual type, while for a user that has completely lost the visual ability or has profound difficulties in seeing the scene, the requirement may be for converting the user interface elements of a visual type into a hearing type, and the like.

As mentioned above, the user's accessibility requirement can be identified based on the acquired disability-related information in various manners, for example, by retrieving a matched accessibility requirement from a personal or public accessibility requirement repository. Details are described hereinafter.

In an embodiment, the accessibility requirement of the user 301 can be identified from a personal accessibility requirement repository. The personal accessibility requirement repository can store the accessibility requirement of the user based on the user's historical data. In this embodiment, the personal accessibility requirement repository can record the accessibility requirements that the user has used. For example, if a user has their own unique or clear accessibility requirements, the user can input them into their personal accessibility requirement repository.

Figure 4:
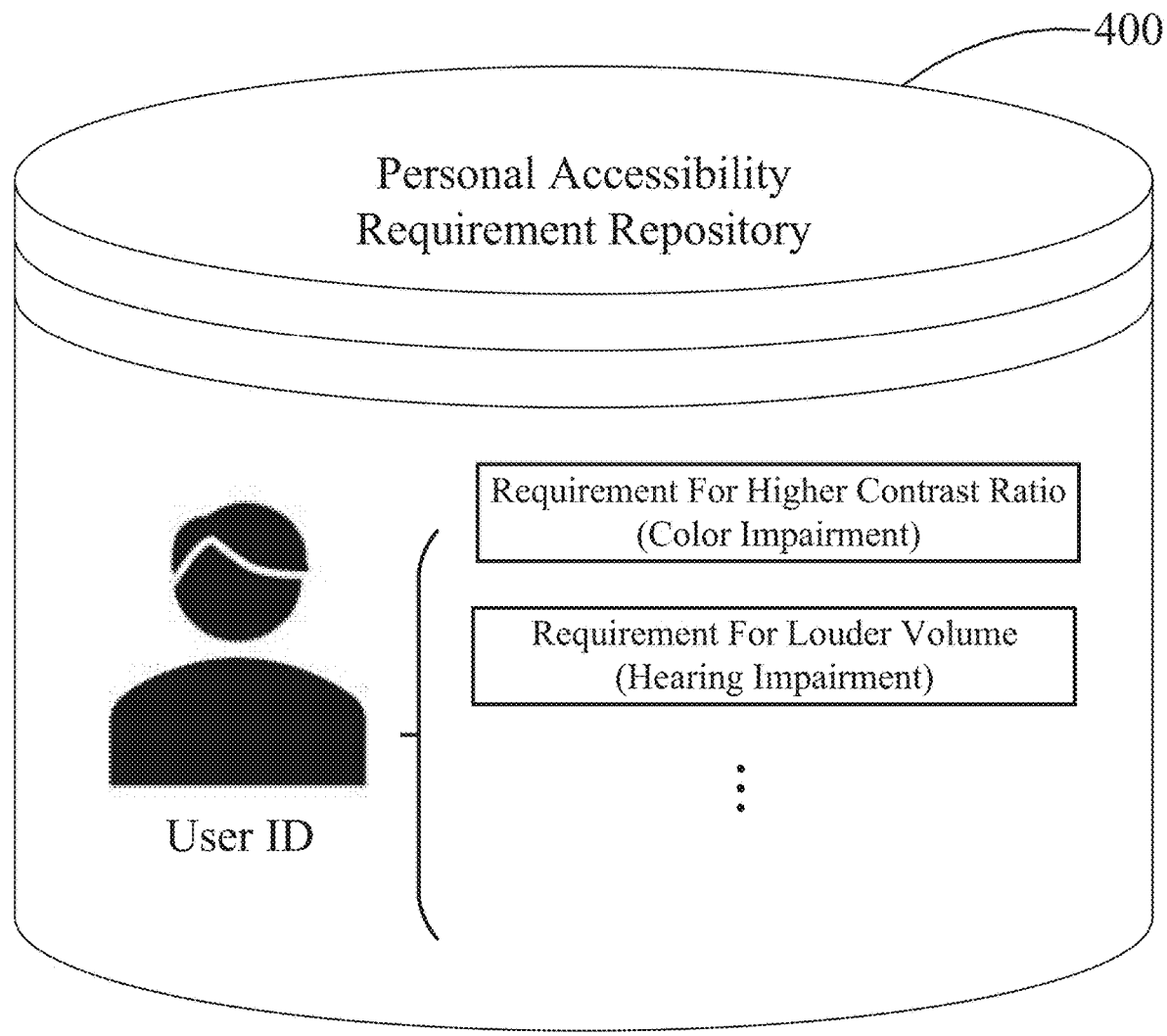
FIG. 4 depicts an exemplary schematic diagram of a personal accessibility requirement repository according to an embodiment of the present disclosure.

FIG. 4 depicts an exemplary schematic diagram of a personal accessibility requirement repository according to an embodiment of the present disclosure. As referenced by the exemplary personal accessibility requirement repository 400 of FIG. 4, the user may have a certain level of visual and hearing impairment (for example, color impairment and hearing impairment). The user can be a registered user of the metaverse system, and may have indicated his accessibility requirement for user interface elements presented in the scene (such as requirement for higher contrast ration and louder volume of the elements) during historical navigations in the metaverse system, such that the accessibility requirement for user can be determined from the disability-related information, such as user ID. Accordingly, the historical accessibility requirement of the user can be stored in the user's personal accessibility requirement repository, and retrieved from the repository 400 for future use.

In another embodiment, the accessibility requirement of the user 301 can be identified from a public accessibility requirement repository. The public accessibility requirement repository can store accessibility requirements of different user groups with different disabilities. In this embodiment, the accessibility requirements of all disabled people who have used the computing device to navigate the metaverse can be collected, analyzed, organized and stored in the public accessibility requirement repository.

Figure 5:
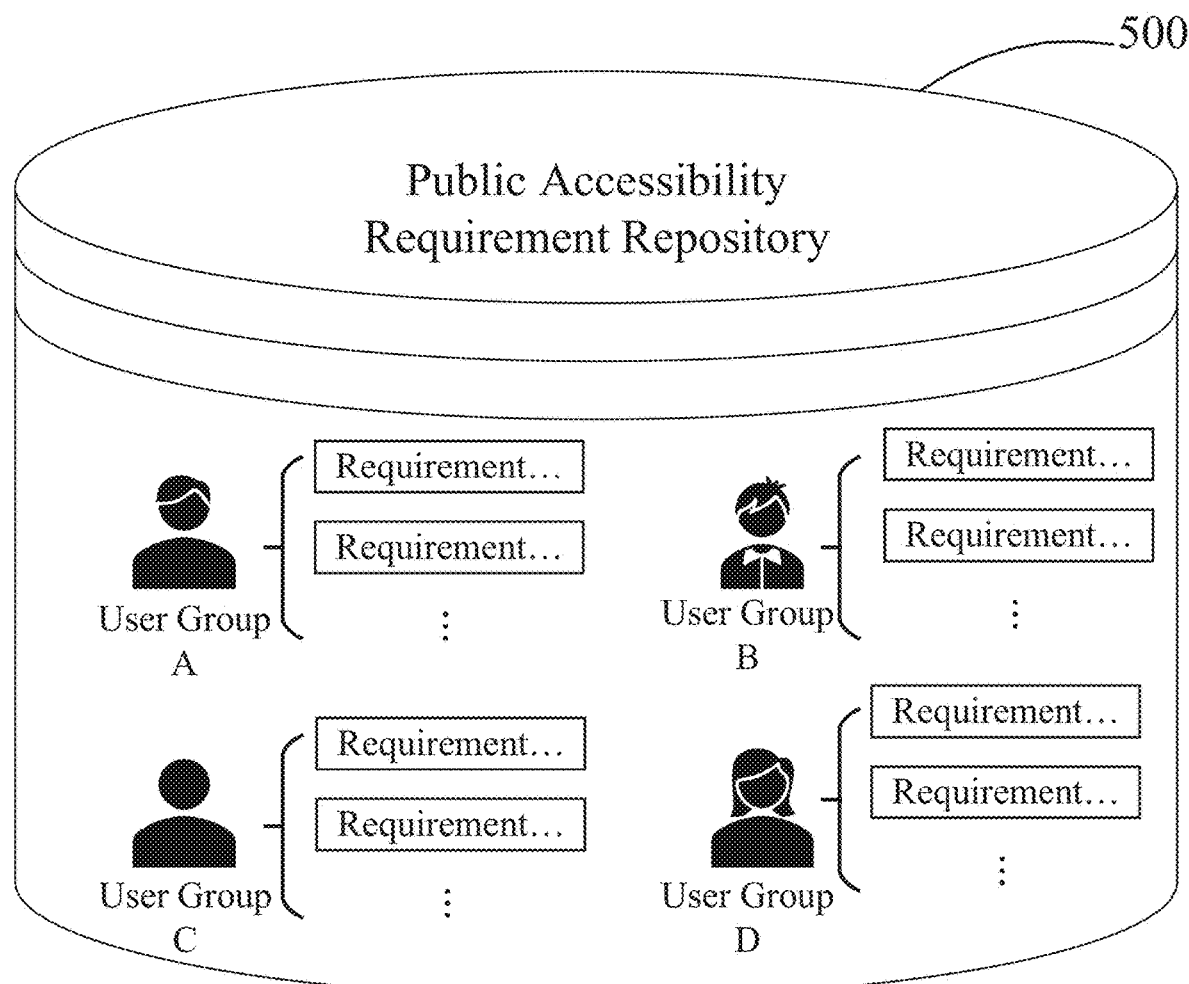
FIG. 5 depicts an exemplary schematic diagram of a public accessibility requirement repository according to an embodiment of the present disclosure.

FIG. 5 depicts an exemplary schematic diagram of a public accessibility requirement repository 500 according to an embodiment of the present disclosure. As referenced by the exemplary public accessibility requirement repository 500 of FIG. 5, the public accessibility requirement repository 500 can store different accessibility requirements for different user groups (e.g., User Groups A, B, C and D) with different disabilities. It should be noted that the public accessibility requirement repository 500 is useful especially for a new user for which no personal accessibility requirement repository has be established. Optionally, the user groups can be further divided into several sub-groups to provide a refined requirement for the users with various disabilities. For example, the user group with visual impairment can be further divided into several sub-groups corresponding to blindness, color-blindness, color-impairment, amblyopia and the like. The granularity for group or sub-group can be set according to the total number of the users and the relative number of users with different disabilities, and the terms of group or sub-group can be used interchangeably in the present disclosure.

As an example, for the user group with color-blindness, it may be needed to add other differentiating attributes if the user interface elements are distinguished from each other only by color. As another example, for the user group with color-impairment, it may be needed to increase the contrast ratio of the user interface elements. As yet another example, for the user group with amblyopia, it is needed to enlarge a size of the user interface elements. As additional examples, it may be needed to convert speech into text for hearing-impaired users, simplify the operation process for cognitively impaired users, and provide an alternative to gesture manipulation for users with inflexible fingers, and the like.

It should be noted that the identification of the accessibility requirement of the user from the personal accessibility requirement repository (e.g., personal accessibility requirement repository 400 in FIG. 4) or the public accessibility requirement repository (e.g., public accessibility requirement repository 500) can be performed in a predefined priority order. For example, the personal accessibility requirement repository will be firstly checked to determine if the personal and customized accessibility requirement of the current user is available (e.g., whether the user is a registered user). If there is no match (for example, no historical data is available for a new user), the public accessibility requirement repository will be checked next to identify the accessibility requirement of the user based on the accessibility requirements of the user group to which the current user belongs.

Referring back to FIG. 3, when the accessibility requirement of the user 301 is identified either from the personal accessibility requirement repository or the public accessibility requirement repository, a processing routine can be determined from a plurality of processing routines stored in a routine library (for example, the routine library 305 of FIG. 3) based on the accessibility requirement of the user. Thereafter, the selected processing routine can be used for modifying the user interface elements of the scene. For example, as shown in FIG. 3, before the AR scene is presented to the user based on the streamed data, the user interface elements of the scene should be modified using the selected processing routine.

According to embodiments of the present disclosure, the plurality of processing routines can be stored in the routine library in association with a corresponding plurality of accessibility requirements for individuals with different disabilities, and the processing routine can be determined based on a match with the accessibility requirement of the user. Therefore, different processing routines can be retrieved for users with different accessibility requirements.

As shown in the routine library 305, the plurality of processing routines 305-a, 305-b, 305-c, 305-d and 305-e can be stored in association with a corresponding plurality of accessibility requirements, which are in turn associated with a corresponding plurality of different disabilities. For example, the processing routines as shown in FIG. 3 includes processing routines directed to accessibility requirements from users with color blindness, hearing impairment, and the like.

After the processing routine is determined from among the plurality of processing routines stored in the routine library, one or more of the user interface elements of the scene can be modified using the determined processing routine. According to embodiments of the present disclosure, one or more of the user interface elements within the scene presented to the user that match the identified accessibility requirement of the user can be identified, and then the user interface elements can be modified using the determined processing routine. For example, the AR scene presented to the user may include a collection of user interfaces in a visual type, user interfaces in an audible type, and user interfaces in a mixed type, among other examples. In this example, for a user with visual impairment, the user interfaces in the visual type and the mixed type may be identified as user interface elements that match the accessibility requirement of the user, while the user interfaces in the audible type are not. Accordingly, the modification to the scene can be performed to the user interfaces in the visual type and the mixed type, rather than the audible type.

In a first embodiment of the present disclosure, modifying the one or more of the user interface elements can involve increasing a contrast ratio of the one or more of the user interface elements for the user. This may enhance the accessibility of the related services for a user with color impairment.

In a second embodiment of the present disclosure, modifying the one or more of the user interface elements can involve enlarging a size of the one or more of the user interface elements for the user. This may enhance the accessibility of the related services for a user with amblyopia.

In a third embodiment of the present disclosure, modifying the one or more of the user interface elements can involve converting the one or more of the user interface elements in one of a visual type and an audible type into the other type. This may enhance the accessibility for a user who has visual or hearing impairment and prefers using another sensory organ to assist in obtaining the related services.

In a fourth embodiment of the present disclosure, modifying the one or more of the user interface elements can involve simplifying an operation flow of the one or more of the user interface elements for the user. As an example, simplifying an operation flow may involve providing easily understood content, minimizing distractions (such as unnecessary content or advertisements), dividing processes into logical, essential steps, easy authentication and the like, which may enhance the accessibility for a user with cognitive impairments.

In a fifth embodiment of the present disclosure, modifying the one or more of the user interface elements can involve providing an alternative interaction mode for the one or more of the user interface elements for the user. As an example, for a user with motor dysfunction (such as inflexible fingers) who may have difficulties in interacting with the metaverse through gesture feedback, an alternative interaction mode based on voice commands can be provided.

Figure 6:
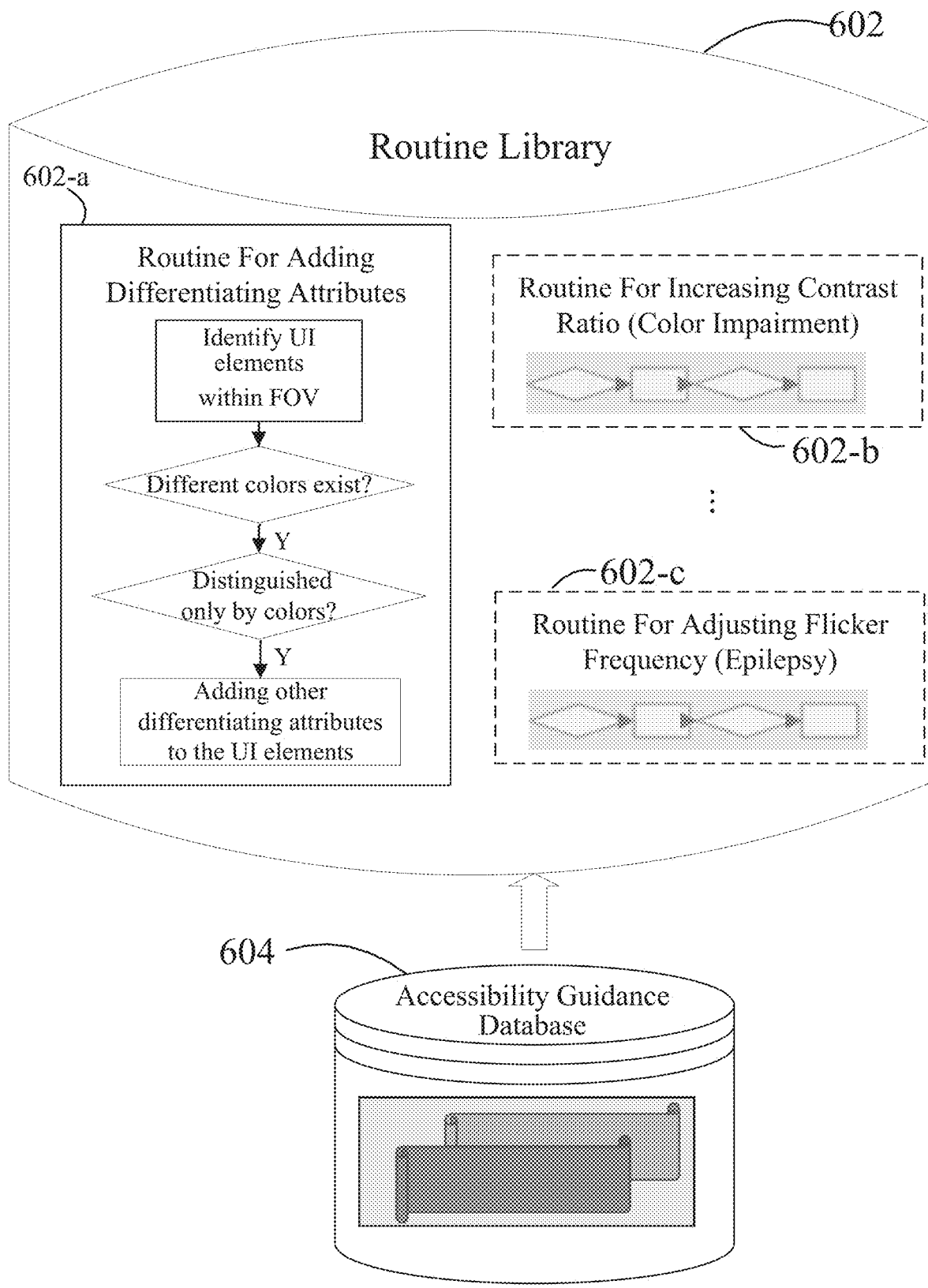
FIG. 6 depicts an exemplary schematic diagram of a routine library according to an embodiment of the present disclosure.

FIG. 6 depicts an exemplary schematic diagram of a routine library according to an embodiment of the present disclosure. As referenced by the routine library 602 of FIG. 6, a plurality of processing routines 602-a, 602-b, 602-c may be stored in association with a corresponding plurality of accessibility requirements, and each of the processing routines comprises program codes executable to modify the user interface elements of the scene presented to the user. For example, when the disability-related information of the user indicates that the user is color-blind, and the accessibility requirement indicates that one or more differentiating attributes are needed to be added to the scene, the processing routines 602-a can be determined from the routine library 602 based on a match with the accessibility requirement.

As referenced by processing routines 602-*a*, the processing routine for adding differentiating attributes can correspond to an execution process, which may include program codes executable to identify one or more user interface elements rendered in different colors within the field of view of the user, determine whether the user interface elements are distinguished from each other based only on the different colors, and add one or more other differentiating attributes to the user interface elements. Similarly, each of the processing routine for increasing contrast ratio 602-*b* and the processing routine for adjusting flicker frequency 602-*c* may also have a corresponding execution process, which may include program codes executable to modify the user interface elements of the scene presented to a user with a different accessibility requirement.

Further as shown in FIG. 6, the plurality of processing routines stored in the routine library 602 can be generated based on accessibility guidelines retrieved from an accessibility guidance database 604. According to the embodiments of the present disclosure, the processing routines can be generated by the filtering, analyzing, and transforming the existing accessibility guidelines available from the accessibility guidance database. For example, the existing accessibility guidelines can be obtained from World Wide Web Consortium (W3C), which develops standards and support materials to help developers understand and implement accessibility to make the websites, applications, and other digital creations more accessible to everyone.

In an embodiment, the numerous existing accessibility guidelines available from the accessibility guidance database can be checked to screen out accessibility guidelines that are most relevant and applicable to the current metaverse system. Next, the applicable accessibility guidelines can be analyzed to form a mapping between various accessibility requirements and corresponding suggestions on the Web development. Finally, the various accessibility requirements and corresponding suggestions can be transformed into the plurality of processing routines which are associated with a corresponding plurality of accessibility requirements for individuals with different disabilities, for example, as referenced by the plurality of processing routines 602-*a*, 602-*b* and 602-*c* stored in the routine library 602.

It should be noted that the processing routines should be updated over time to satisfy the growing demand of the individuals with disabilities.

In an embodiment, the plurality of processing routines stored in the routine library 602 can be updated based on an update to the existing accessibility guidelines in the accessibility guidance database 604. For example, the existing accessibility guidelines can be upgraded based on the latest standards and laws, and the plurality of processing routines can be updated based on the latest accessibility guidelines.

In another embodiment, the plurality of processing routines stored in the routine library 602 can be updated based on a manual editing by the user. For example, user can add, update, and delete the processing routines stored in the routine library 602 according to their preference.

Figure 7:
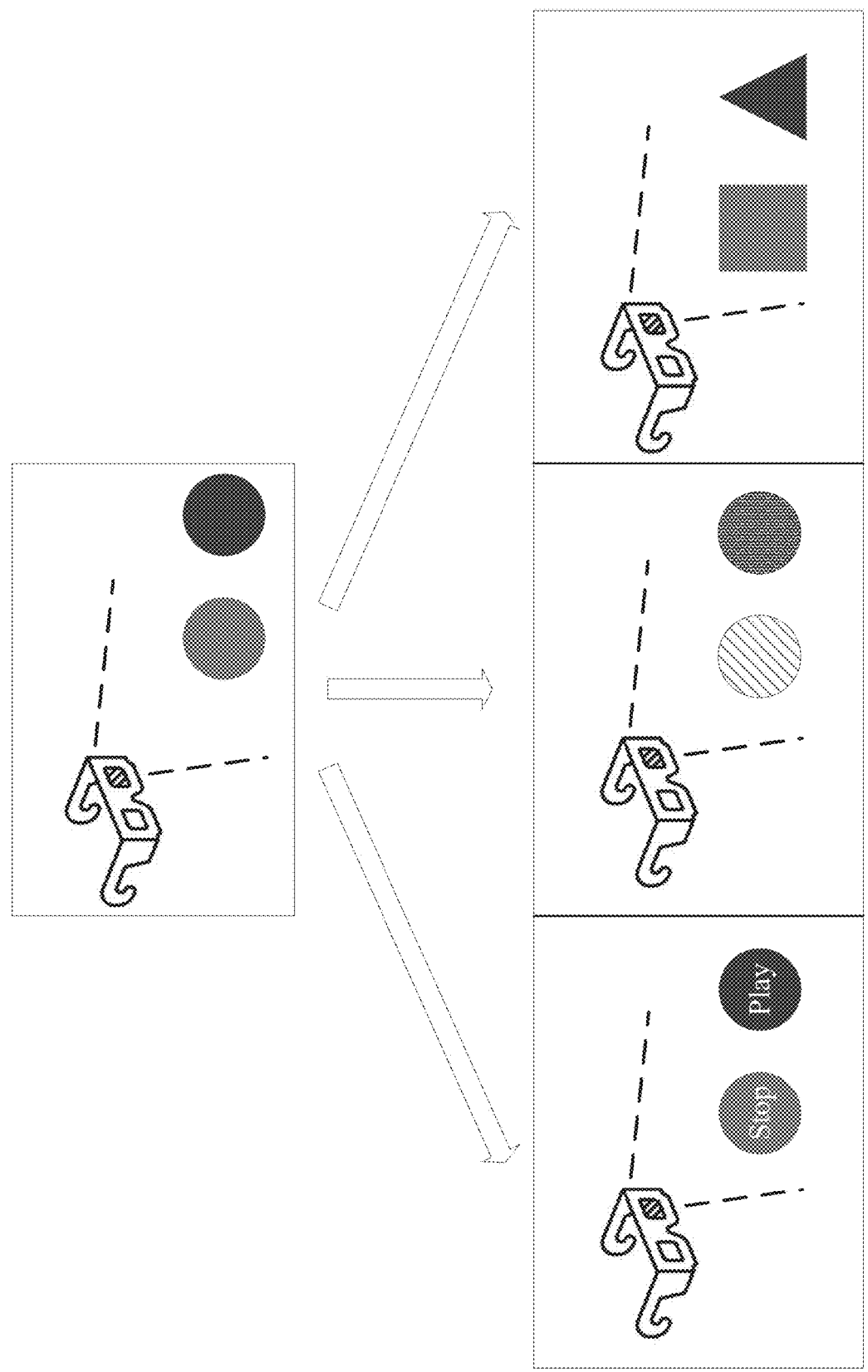
FIG. 7 depicts an exemplary schematic diagram of a comparison for a scene presented to a user before and after the accessibility is enhanced according to an embodiment of the present disclosure.

FIG. 7 depicts an exemplary schematic diagram of a comparison for a scene presented to a user before and after the accessibility is enhanced according to an embodiment of the present disclosure.

For example, a user may want to obtain access to the AR experience through an integrated metaverse platform but may have color blindness for which the user is unable to distinguish certain colors. In this case, as shown at the top of FIG. 7, the user may not have the ability to well distinguish between different interactive buttons presented by different colors. For example, a first button representative of "Stop" action in the AR scene may be rendered in color red (not shown), while a second button representative of "Play" action in the AR scene may be rendered in color green (not shown). The present disclosure can facilitate the discrimination of the different buttons such that they can be easily recognizable by the user, which allows for the user's interaction with the buttons in an efficient and convenient manner, for example, when the user brings their hand into view to interact with the buttons of the user interface and enjoys the AR experience.

As shown at the bottom side of FIG. 7, a processing routine that matches the user's accessibility requirement may be retrieved from the routine library, and can be used to modify the user interface elements (namely, the two button elements as mentioned above) of the scene presented to the user. The processing routine can be selected and executed to enhance the buttons with accessibility defects, for example, by adding text descriptions (as shown on the left bottom of FIG. 7), adding different background patterns or borders (as shown on the middle bottom of FIG. 7), changing shapes (as shown on the right bottom of FIG. 7) and other suitable processing, such that these buttons can be easily distinguished from each other without color.

Figure 8:
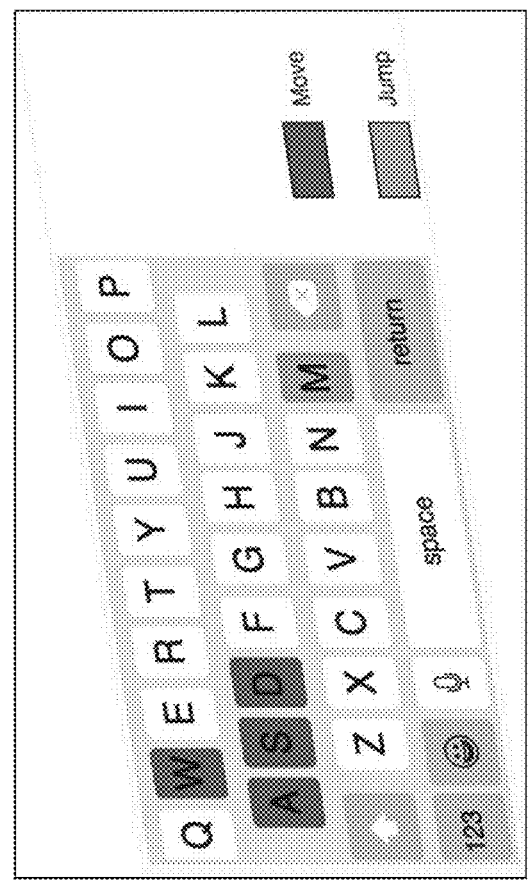
FIG. 8 depicts another exemplary schematic diagram of a comparison for a scene presented to a user before and after the accessibility is enhanced according to an embodiment of the present disclosure.
Figure 8:
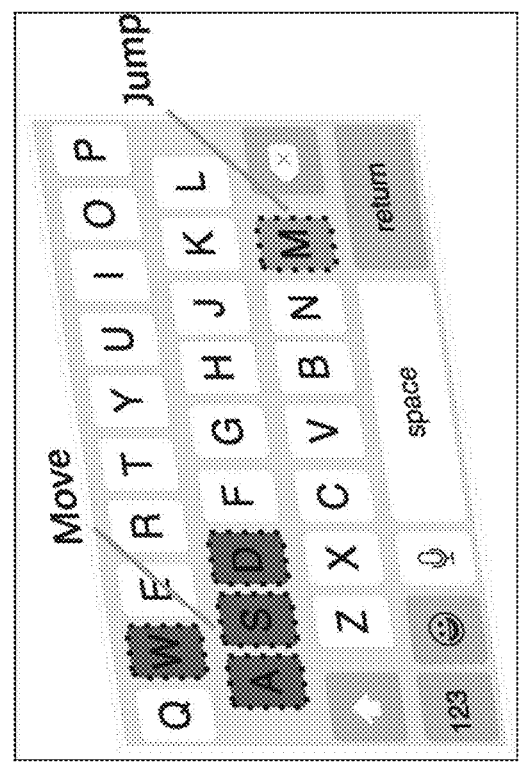

FIG. 8 depicts another exemplary schematic diagram of a comparison for a scene presented to a user before and after the accessibility is enhanced according to an embodiment of the present disclosure.

As shown on the left of FIG. 8, a first key area including virtual keys "W", "A", "S" and "D" may correspond to the "Move" action in the AR scene and displayed in color blue (not shown), while a second key area including the virtual key "M" may correspond to the "Jump" action in the AR scene and displayed in color green (not shown). Normal users can easily receive this information, but a user with color blindness may have difficulties in distinguishing between the two key areas with different meanings. As a result, the user will be confused in this AR environment. However, the present disclosure can facilitate the discrimination of the different keys corresponding to different functions and manipulations. As shown on the right of FIG. 8, the two key areas corresponding to the "Move" and "Jump" actions can be well distinguished from each other, for example, by adding text descriptions, adding different background patterns or borders, and other suitable manners.

Aspects of the present disclosure are described in the context of metaverse system and discussed mainly in view of user interface elements of visual and audible types. However, it should be noted that the embodiments of the present disclosure for enhancing accessibility for individuals with disabilities also apply to various platforms and various types of user interface elements in such platforms. The present disclosure does not restrict the type of system in which the users, even and especially for individuals with disabilities, may obtain access to the products and services for various activities of daily living. For example, the techniques for enhancing accessibility for individuals with disabilities may be implemented as an application on a local device. As another example, the techniques for enhancing accessibility for individuals with disabilities may be implemented as a service on the cloud or a server.

Figure 9:
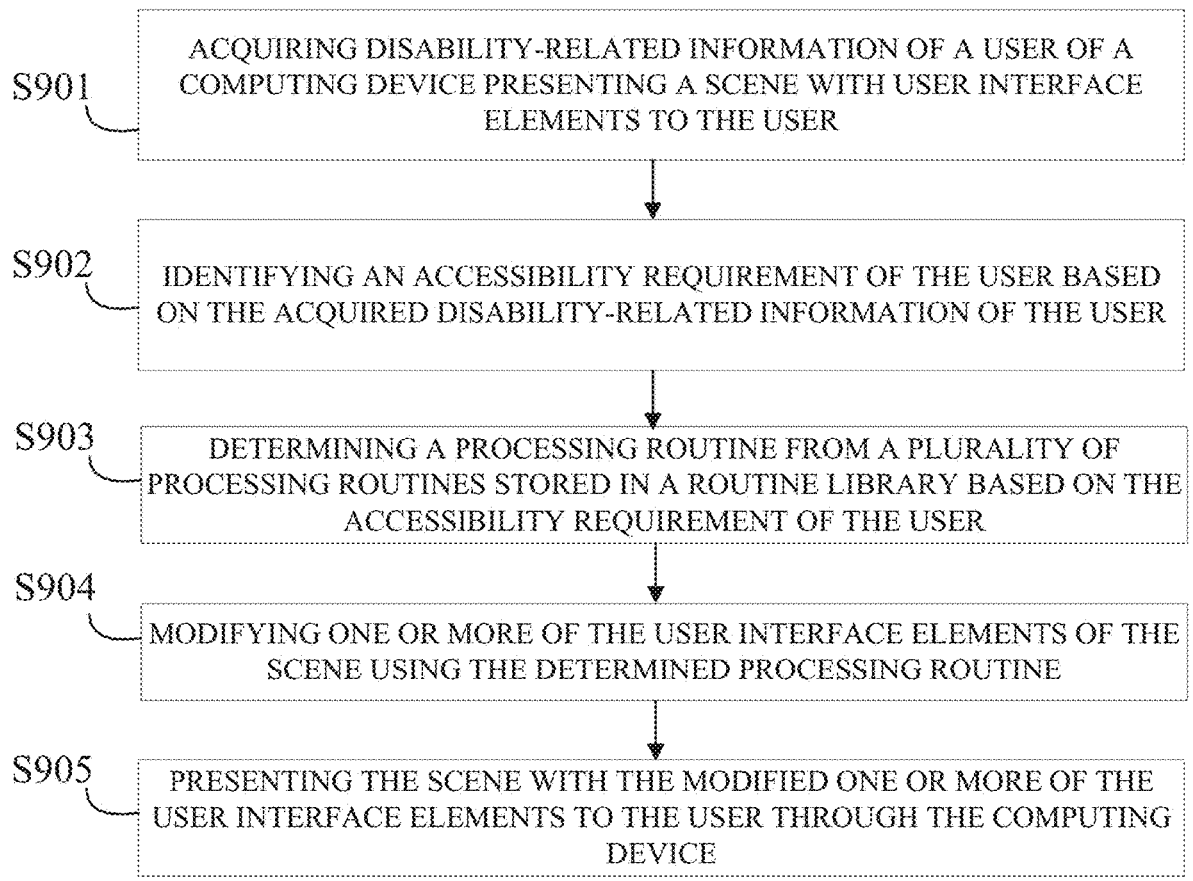
FIG. 9 shows a flowchart of a computer-implemented method of enhancing accessibility for individuals with disabilities according to an embodiment of the present disclosure.

FIG. 9 shows a flowchart of a computer-implemented method 900 of enhancing accessibility for individuals with disabilities according to an embodiment of the present disclosure. The detailed description of method 900 can refer to the content described in the above with respect to FIGS. 1-8. For example, method 900 can be executed by the architecture for enhancing accessibility for individuals with disabilities described with respect to FIG. 3. Each step of method 900 can be performed by one or more processing units, such as central processing unit (CPU).

With reference to FIG. 9, method 900 comprises steps 901-905. At step 901, disability-related information of a user of a computing device can be acquired. The computing device can present a scene with user interface elements to the user.

In an embodiment of the present disclosure, the disability-related information of the user indicates one or more of: visual impairment, hearing impairment, cognitive impairment, neurological disorder, and motor dysfunction.

At step 902, an accessibility requirement of the user can be identified based on the acquired disability-related information of the user. As an example, the accessibility requirement of the user can indicate a requirement for enhancing one or more of the user interface elements in a type corresponding to the user's disability. As another example, the accessibility requirement of the user can indicate a requirement for converting one or more of the user interface elements in the type corresponding to the user's disability into a different type.

In an embodiment of the present disclosure, the accessibility requirement of the user can be identified from a personal accessibility requirement repository (such as personal accessibility requirement repository 400 as shown in FIG. 4). In an example, the personal accessibility requirement repository can store the accessibility requirement of the user based on the user's historical data.

In another embodiment of the present disclosure, the accessibility requirement of the user can be identified from a public accessibility requirement repository (such as public accessibility requirement repository 500 as shown in FIG. 5). In an example, the public accessibility requirement repository 500 can store accessibility requirements of different user groups with different disabilities.

At step 903, a processing routine can be determined from a plurality of processing routines stored in a routine library (such as routine library 305 as shown in FIG. 3, and routine library 602 as shown in FIG. 6) based on the accessibility requirement of the user.

In an embodiment of the present disclosure, the plurality of processing routines can be stored in the routine library in association with a corresponding plurality of accessibility requirements for individuals with different disabilities. Accordingly, the processing routine is determined based on a match between the processing routine and the accessibility requirement of the user.

In another embodiment of the present disclosure, the plurality of processing routines stored in the routine library can be generated based on accessibility guidelines retrieved from an accessibility guidance database. The plurality of processing routines stored in the routine library can be updated based on an update to the accessibility guidelines and/or a manual editing by the user.

In an example, the disability-related information of the user may indicate that the user is color-blind. In this example, the processing routine that matches the disability-related information and accessibility requirement of the user comprises program codes executable for: identifying, by one or more processing units, one or more user interface elements rendered in different colors within the field of view of the user; determining, by one or more processing units, whether the user interface elements are distinguished from each other based only on the different colors; and adding, by one or more processing units, one or more other differentiating attributes to the user interface elements.

At step 904, one or more of the user interface elements of the scene (such as the scene with user interface elements presented to the user through computing device 302 as shown in FIG. 3) can be modified using the determined processing routine.

In an embodiment of the present disclosure, one or more of the user interface elements within the scene presented to the user that match the identified accessibility requirement of the use can be identified, and can be modified using the determined processing routine.

As a first example of the embodiment, modifying the one or more of the user interface elements can involve increasing a contrast ratio of the one or more of the user interface elements for the user.

As a second example of the embodiment, modifying the one or more of the user interface elements can involve enlarging a size of the one or more of the user interface elements for the user.

As a third example of the embodiment, modifying the one or more of the user interface elements can involve converting the one or more of the user interface elements in one of a visual type and an audible type into the other type.

As a fourth example of the embodiment, modifying the one or more of the user interface elements can involve simplifying an operation flow of the one or more of the user interface elements for the user.

As a fifth example of the embodiment, modifying the one or more of the user interface elements can involve providing an alternative interaction mode for the one or more of the user interface elements for the user.

At step 905, the scene with the modified one or more of the user interface elements can be presented to the user through the computing device.

In an embodiment of the present disclosure, the scene with user interface elements is implemented in a metaverse system.

Figure 10:
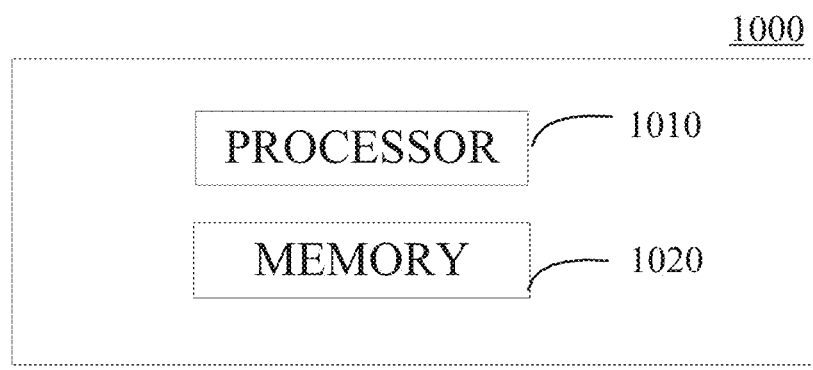
FIG. 10 shows a system of enhancing accessibility for individuals with disabilities according to an embodiment of the present disclosure.

FIG. 10 shows a system 1000 of enhancing accessibility for individuals with disabilities according to an embodiment of the present disclosure. The system 1000 of enhancing accessibility for individuals with disabilities comprises one or more processors 1010 and a memory 1020 coupled to at least one of the processors 1010. A set of computer program instructions are stored in the memory 1020. When executed by at least one of the processors 1010, the set of computer program instructions perform following series of actions. Disability-related information of a user of a computing device can be acquired, the computing device can present a scene with user interface elements to the user. An accessibility requirement of the user can be identified based on the acquired disability-related information of the user. A processing routine can be determined from a plurality of processing routines stored in a routine library based on the accessibility requirement of the user. One or more of the user interface elements of the scene can be modified using the determined processing routine. The scene with the modified one or more of the user interface elements can be presented to the user through the computing device.

In an embodiment, the identifying accessibility requirement of the user based on the acquired disability-related information of the user can comprise: identifying the accessibility requirement of the user from a personal accessibility requirement repository. The personal accessibility requirement repository can store the accessibility requirement of the user based on the user's historical data.

In an embodiment, the identifying accessibility requirement of the user based on the acquired disability-related information of the user can comprise: identifying the accessibility requirement of the user from a public accessibility requirement repository. The public accessibility requirement repository can store accessibility requirements of different user groups with different disabilities.

In an embodiment, the disability-related information of the user can indicate one or more of: visual impairment, hearing impairment, cognitive impairment, neurological disorder, and motor dysfunction.

In an embodiment, the accessibility requirement of the user can indicate a requirement for enhancing one or more of the user interface elements in a type corresponding to the user's disability.

In an embodiment, the accessibility requirement of the user can indicate a requirement for converting one or more of the user interface elements in the type corresponding to the user's disability into a different type.

In an embodiment, the plurality of processing routines can be stored in the routine library in association with a corresponding plurality of accessibility requirements for individuals with different disabilities. Accordingly, the processing routine can be determined based on a match between the processing routine and the accessibility requirement of the user.

In an embodiment, the modifying one or more of the user interface elements of the scene using the determined processing routine can comprises identifying one or more of the user interface elements within the scene presented to the user that match the identified accessibility requirement of the user, and modifying the user interface elements using the determined processing routine.

In an embodiment, the modifying the one or more of the user interface elements using the determined processing routine can comprise one or more of the following: increasing, by one or more processing units, a contrast ratio of the one or more of the user interface elements for the user; enlarging, by one or more processing units, a size of the one or more of the user interface elements for the user: converting, by one or more processing units, the one or more of the user interface elements in one of a visual type and an audible type into the other type: simplifying, by one or more processing units, an operation flow of the one or more of the user interface elements for the user; and providing, by one or more processing units, an alternative interaction mode for the one or more of the user interface elements for the user.

In an embodiment, the disability-related information of the user can indicate that the user is color-blind. In this embodiment, the processing routine comprises program codes executable for: identifying one or more user interface elements rendered in different colors within the field of view of the user: determining whether the user interface elements are distinguished from each other based only on the different colors; and adding one or more other differentiating attributes to the user interface elements.

In an embodiment, the plurality of processing routines stored in the routine library can be generated based on accessibility guidelines retrieved from an accessibility guidance database. Additionally, the plurality of processing routines stored in the routine library are updated based on an update to the accessibility guidelines and/or a manual editing by the user.

In an embodiment, the scene with user interface elements is implemented in a metaverse system. Accordingly, system 1000 of enhancing accessibility for individuals with disabilities is implemented in the metaverse system.

In addition, according to another embodiment of the present disclosure, a computer program product for enhancing accessibility for individuals with disabilities is disclosed. As an example, the computer program product comprises a non-transitory computer readable storage medium having program instructions embodied therewith, and the program instructions are executable by a processor. When executed, the program instructions cause the processor to perform one or more of the above described procedures, and details are omitted herein for conciseness.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for enhancing accessibility for individuals with disabilities, comprising:
   acquiring, by one or more processing units, disability-related information of a user of a computing device presenting a scene with user interface elements to the user, the scene being implemented in a metaverse system;
   identifying, by one or more processing units, an accessibility requirement of the user based on the acquired disability-related information of the user obtained from a personal accessibility requirement repository, wherein the personal accessibility requirement repository stores the accessibility requirement of the user based on historical data of the user during navigations in the metaverse system;
   determining, by one or more processing units, a processing routine from a plurality of processing routines stored in a routine library based on the accessibility requirement of the user;
   modifying, by one or more processing units, one or more of the user interface elements of the scene using the determined processing routine; and
   presenting, by one or more processing units, the scene with the modified one or more of the user interface elements to the user through the computing device,
   wherein the plurality of processing routines stored in the routine library are generated by filtering, analyzing, and transforming existing accessibility guidelines retrieved from an accessibility guidance database.

2. The computer-implemented method of claim 1, wherein the identifying of the accessibility requirement of the user based on the acquired disability-related information of the user comprises:
   identifying, by one or more processing units, the accessibility requirement of the user from a public accessibility requirement repository storing accessibility requirements of different user groups with different disabilities.

3. The computer-implemented method of claim 1, wherein the disability-related information of the user indicates one or more of: visual impairment, hearing impairment, cognitive impairment, neurological disorder, and motor dysfunction.

4. The computer-implemented method of claim 1, wherein the accessibility requirement of the user indicates one or more of the following:
enhancing one or more of the user interface elements in a type corresponding to the disability-related information of the user; and
converting one or more of the user interface elements in the type corresponding to the disability-related information of the user into a different type.

5. The computer-implemented method of claim 1, wherein the plurality of processing routines are stored in the routine library in association with a corresponding plurality of accessibility requirements for individuals with different disabilities, and
wherein the processing routine is determined based on a match between the processing routine and the accessibility requirement of the user.

6. The computer-implemented method of claim 1, wherein the modifying of the one or more of the user interface elements of the scene using the determined processing routine comprises:
identifying, by one or more processing units, one or more of the user interface elements within the scene presented to the user that match the identified accessibility requirement of the user; and
modifying, by one or more processing units, the one or more of the user interface elements using the determined processing routine.

7. The computer-implemented method of claim 1, wherein the modifying of the one or more of the user interface elements using the determined processing routine comprises one or more of the following:
increasing, by one or more processing units, a contrast ratio of the one or more of the user interface elements for the user;
enlarging, by one or more processing units, a size of the one or more of the user interface elements for the user;
converting, by one or more processing units, the one or more of the user interface elements in one of a visual type and an audible type into the other type;
simplifying, by one or more processing units, an operation flow of the one or more of the user interface elements for the user; and
providing, by one or more processing units, an alternative interaction mode for the one or more of the user interface elements for the user.

8. The computer-implemented method of claim 1, wherein the disability-related information of the user indicates that the user is color-blind, and the processing routine comprises program codes executable for:
identifying, by one or more processing units, one or more user interface elements rendered in different colors within a field of view of the user;
determining, by one or more processing units, whether the user interface elements are distinguished from each other based only on the different colors; and
adding, by one or more processing units, one or more other differentiating attributes to the user interface elements.

9. The computer-implemented method of claim 1, wherein the plurality of processing routines stored in the routine library are updated based on an update to the accessibility guidelines and/or a manual editing by the user.

10. A system for enhancing accessibility for individuals with disabilities, comprising:
one or more processors;
a memory coupled to at least one of the processors; and
a set of computer program instructions stored in the memory, which, when executed by at least one of the processors, perform actions of:
acquiring disability-related information of a user of a computing device presenting a scene with user interface elements to the user, the scene being implemented in a metaverse system;
identifying an accessibility requirement of the user based on the acquired disability-related information of the user obtained from a personal accessibility requirement repository, wherein the personal accessibility requirement repository stores the accessibility requirement of the user based on historical data of the user during navigations in the metaverse system;
determining a processing routine from a plurality of processing routines stored in a routine library based on the accessibility requirement of the user;
modifying one or more of the user interface elements of the scene using the determined processing routine; and
presenting the scene with the modified one or more of the user interface elements to the user through the computing device,
wherein the plurality of processing routines stored in the routine library are generated by filtering, analyzing, and transforming existing accessibility guidelines retrieved from an accessibility guidance database.

11. The system of claim 10, wherein the identifying of the accessibility requirement of the user based on the acquired disability-related information of the user comprises:
identifying the accessibility requirement of the user from a public accessibility requirement repository storing accessibility requirements of different user groups with different disabilities.

12. The system of claim 10, wherein the accessibility requirement of the user indicates one or more of the following:
enhancing one or more of the user interface elements in a type corresponding to the disability-related information of the user; and
converting one or more of the user interface elements in the type corresponding to the disability-related information of the user into a different type.

13. The system of claim 10, wherein the plurality of processing routines are stored in the routine library in association with a corresponding plurality of accessibility requirements for individuals with different disabilities, and
wherein the processing routine is determined based on a match between the processing routine and the accessibility requirement of the user.

14. The system of claim 10, wherein the modifying of the one or more of the user interface elements of the scene using the determined processing routine comprises:
identifying one or more of the user interface elements within the scene presented to the user that match the identified accessibility requirement of the user; and
modifying the one or more of the user interface elements using the determined processing routine.

15. A computer program product for enhancing accessibility for individuals with disabilities, the computer program product comprising a computer readable storage medium having program instructions embodied therewith, the program instructions executable by a processor to cause the processor to:
- acquire disability-related information of a user of a computing device presenting a scene with user interface elements to the user, the scene being implemented in a metaverse system;
- identify an accessibility requirement of the user based on the acquired disability-related information of the user obtained from a personal accessibility requirement repository, wherein the personal accessibility requirement repository stores the accessibility requirement of the user based on historical data of the user during navigations in the metaverse system;
- determine a processing routine from a plurality of processing routines stored in a routine library based on the accessibility requirement of the user;
- modify one or more of the user interface elements of the scene using the determined processing routine; and
- present the scene with the modified one or more of the user interface elements to the user through the computing device,
- wherein the plurality of processing routines stored in the routine library are generated by filtering, analyzing, and transforming existing accessibility guidelines retrieved from an accessibility guidance database.

* * * * *